(12) United States Patent
Yoo (10) Patent No.: US 7,934,976 B2
(45) Date of Patent: May 3, 2011

(54) APPARATUS AND METHOD FOR SCRIBING SUBSTRATE

(75) Inventor: Kwang Jong Yoo, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 279 days.

(21) Appl. No.: 11/126,733

(22) Filed: May 10, 2005

(65) Prior Publication Data
US 2005/0252943 A1 Nov. 17, 2005

(30) Foreign Application Priority Data

May 11, 2004 (KR) .................. 10-2004-0032937

(51) Int. Cl.
*B24B 49/00* (2006.01)
*B24B 51/00* (2006.01)
*B26D 5/00* (2006.01)
*B26D 3/08* (2006.01)
*B31B 1/25* (2006.01)
*B26F 3/00* (2006.01)

(52) U.S. Cl. .................. 451/7; 83/80; 83/879; 225/93.5

(58) Field of Classification Search ........ 451/7; 83/879, 83/880, 886, 887, 885, 15, 16, 170, 80; 225/93.5
See application file for complete search history.

(56) References Cited

U.S. PATENT DOCUMENTS

| | | | |
|---|---|---|---|
| 3,215,345 A * | 11/1965 | Ferguson | 225/93.5 |
| 3,629,545 A * | 12/1971 | Graham et al. | 219/121.72 |
| 3,862,857 A * | 1/1975 | Gambino | 438/479 |
| 4,653,680 A * | 3/1987 | Regan | 225/104 |
| 4,676,557 A * | 6/1987 | Shope et al. | 299/39.3 |
| 5,598,760 A * | 2/1997 | Sucic et al. | 83/880 |
| 5,626,124 A * | 5/1997 | Chen | 125/23.02 |
| 5,826,772 A * | 10/1998 | Ariglio et al. | 225/2 |
| 6,096,247 A * | 8/2000 | Ulsh et al. | 264/2.7 |
| 6,105,567 A * | 8/2000 | Sun et al. | 125/13.01 |
| 6,211,488 B1 * | 4/2001 | Hoekstra et al. | 219/121.72 |
| 6,252,197 B1 * | 6/2001 | Hoekstra et al. | 219/121.84 |
| 6,259,058 B1 * | 7/2001 | Hoekstra | 219/121.75 |
| 6,402,004 B1 * | 6/2002 | Yoshikuni et al. | 225/2 |
| 6,420,678 B1 * | 7/2002 | Hoekstra | 219/121.75 |
| 6,432,527 B1 * | 8/2002 | Perez et al. | 428/343 |

(Continued)

FOREIGN PATENT DOCUMENTS

CA 1 152 821 8/1983

(Continued)

OTHER PUBLICATIONS

Office Action issued in corresponding Taiwanese Patent Application No. 094115271; issued Apr. 12, 2010.

*Primary Examiner* — Joseph J Hail, III
*Assistant Examiner* — Alvin J. Grant
(74) *Attorney, Agent, or Firm* — Brinks Hofer Gilson & Lione (57) ABSTRACT

A scribing apparatus for scribing a substrate improves productivity as well as prevents substrate deterioration. The apparatus according to an embodiment of the present invention includes a wheel to scribe a substrate, a refrigerant supplier installed near one side of the wheel to spray a refrigerant to the substrate; and a hot steam supplier installed near the other side of the wheel to spray a hot steam to the substrate.

12 Claims, 7 Drawing Sheets

U.S. PATENT DOCUMENTS

| | | | |
|---|---|---|---|
| 6,660,963 B2 * | 12/2003 | Hoekstra et al. | 219/121.72 |
| 6,829,910 B1 * | 12/2004 | Hsieh et al. | 65/112 |
| 6,901,670 B2 * | 6/2005 | Wakayama et al. | 33/18.1 |
| 7,104,431 B2 * | 9/2006 | Luettgens et al. | 225/2 |
| 7,426,883 B2 * | 9/2008 | Nishio et al. | 83/435 |
| 2002/0006765 A1 * | 1/2002 | Michel et al. | 451/28 |
| 2002/0108260 A1 * | 8/2002 | Gartner et al. | 33/18.1 |
| 2003/0051353 A1 * | 3/2003 | Gartner et al. | 33/18.1 |
| 2006/0137505 A1 * | 6/2006 | Wakayama | 83/880 |
| 2007/0175304 A1 * | 8/2007 | In't Veld et al. | 83/169 |

FOREIGN PATENT DOCUMENTS

| | | |
|---|---|---|
| EP | 0 397 236 A1 | 11/1990 |
| JP | 4/265243 | 9/1992 |
| JP | 5-185270 | 7/1993 |
| JP | 6-39572 | 2/1994 |
| TW | 521020 | 2/2003 |
| WO | 93/20015 | 10/1993 |

* cited by examiner

APPARATUS AND METHOD FOR SCRIBING SUBSTRATE

This application claims the benefit of the Korean Patent Application No. P2004-32937 filed on May 11, 2004, which is hereby incorporated by reference.

FIELD OF THE INVENTION

The present invention relates to a scribing apparatus, and more particularly to a scribing apparatus and method for scribing a substrate that improves productivity as well as prevents substrate deterioration.

DESCRIPTION OF THE RELATED ART

Generally, a liquid crystal display LCD device controls the light transmissivity of liquid crystal cells, which are arranged in a matrix shape on a liquid crystal display panel, as a video data signal supplied thereto, thereby displaying a picture corresponding to the data signal on the liquid crystal display panel. The liquid crystal display panel includes a lower plate having electrodes to apply an electric field to a liquid crystal layer, a thin film transistor to switch the supply of data to liquid crystal cells, a signal line to supply data from the outside to the liquid crystal cells and a signal line to supply a control signal of the thin film transistor; an upper plate where a color filter and so on are formed; a spacer formed between the upper and lower plates to secure a fixed cell gap; and a liquid crystal filled in a space provided by the spacer between the upper and lower plates.

In a fabricating method of the liquid crystal display device, a plurality of thin film arrays are independently formed on a large lower substrate. A gate line and a data line are formed to cross in each of the thin film transistor arrays, and a thin film transistor and a pixel electrode are formed in an intersection of the gate line and the data line. The large lower substrate is bonded together with a large upper substrate where a plurality of color filter arrays are independently formed, with a designated cell gap. After bonding the large upper substrate with the lower substrate, a vertical crack with a designated depth is formed in the substrate by use of a scribing apparatus shown in FIG. 1 in order to separate it into individual display devices, and then the substrate is separated by applying impact to the substrate.

Figure 1:
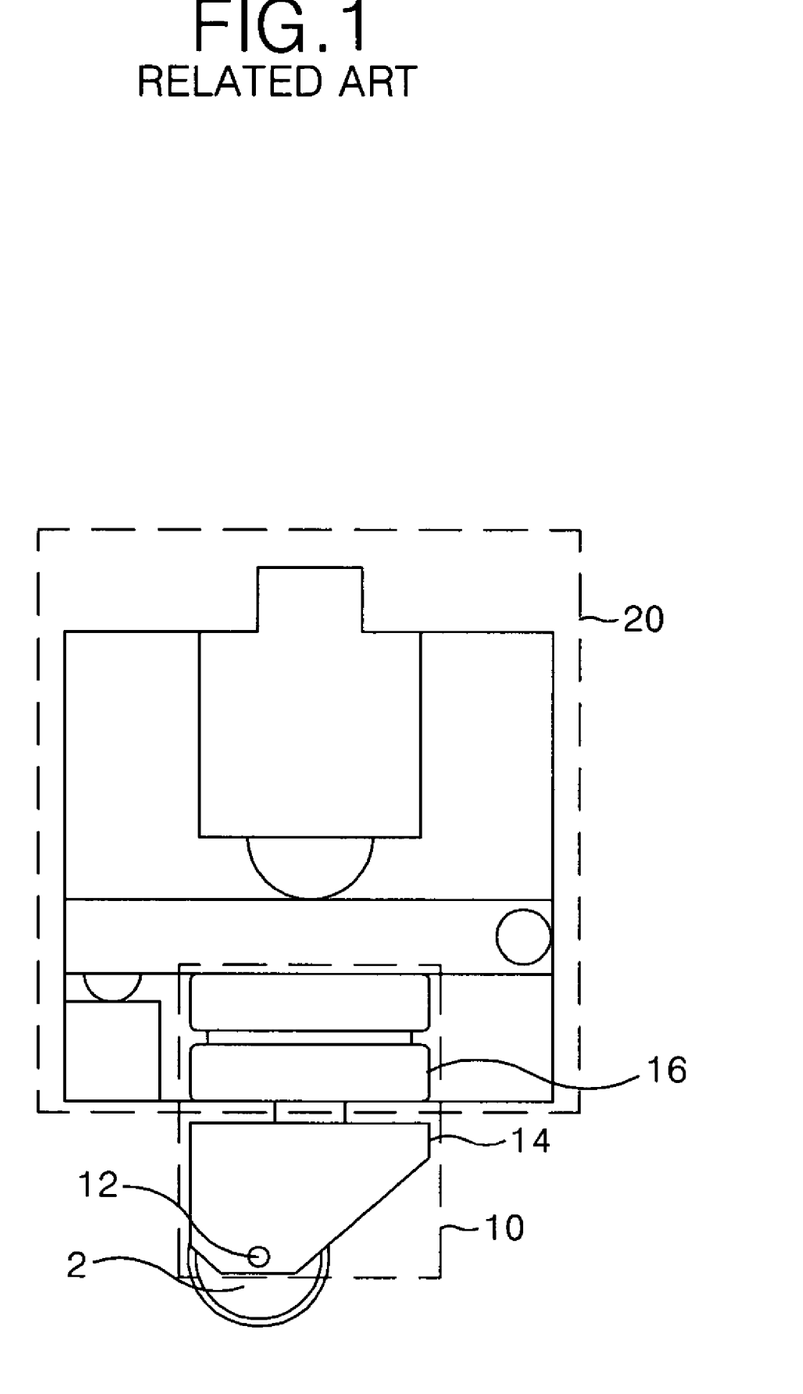
FIG. 1 is a diagram representing a scribing apparatus according to the related art.
Figure 2:
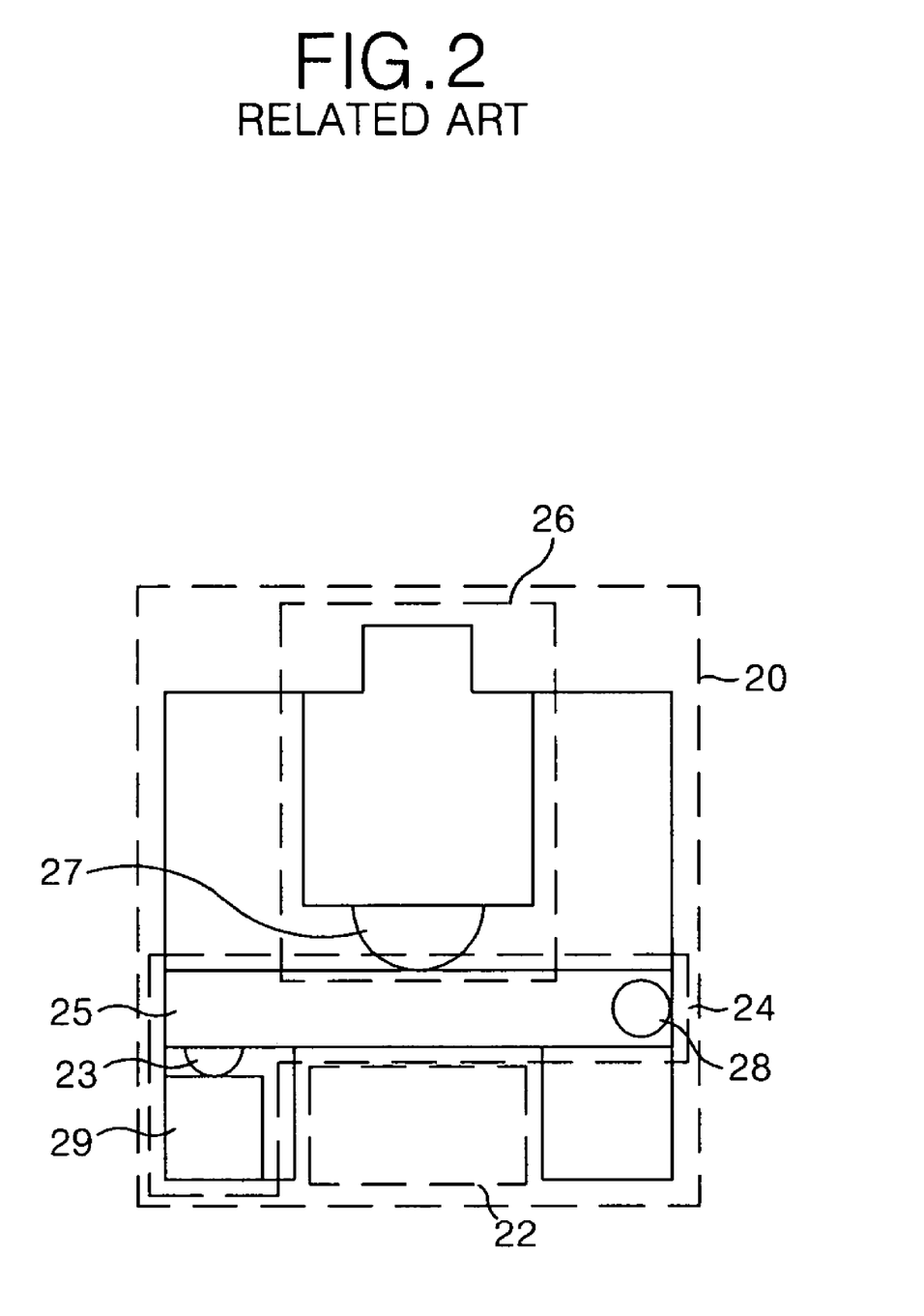
FIG. 2 is a diagram representing a wheel head shown in FIG. 1.

FIG. 1 is a diagram representing a scribing apparatus of the related art, and FIG. 2 is a diagram representing a wheel head shown in FIG. 1.

Referring to FIGS. 1 and 2, the scribing apparatus of the related art includes a wheel 2 to form a vertical crack in a substrate, a wheel holder 10 to fix the wheel 2, and a wheel head 20 to mount the wheel holder 10.

The wheel 2 is in contact with the substrate (bonded or single substrate) and has a round disk shape of 2~3 mm in diameter of which the edge is ground in a designated angle, to form a vertical crack with a designated depth in the substrate. The wheel 2 is classified into a penett wheel having a groove with a designated shape formed in a wheel blade part, and a scribing wheel with no groove formed.

A wheel holder 10 transmits the pressure applied from the wheel head 20 to the wheel 2 and fixes to support the wheel 2. For this, the wheel holder 10 includes a fixing pin 12 to fix the wheel, a wheel fixing jig 14 to support the fixed wheel 2, and a bearing 16 to mount the wheel holder 10 in the wheel head 20.

The wheel head 20 has the wheel holder 10 descend and ascend in accordance with the air pressure of the compressed air supplied by a compressor (not shown). For this, the wheel head 20 includes a holder mounting part 22 on which the wheel holder 10 is mounted, a switching part 24 to control the contact between the wheel 2 and the substrate, and an air cylinder 26 to supply the air pressure of the compressed air supplied from the outside to the wheel holder 10. The wheel head 20 is transferred along a drive shaft of a transporting apparatus such as a ball screw, a pulley belt and an LM guide.

Figure 3:
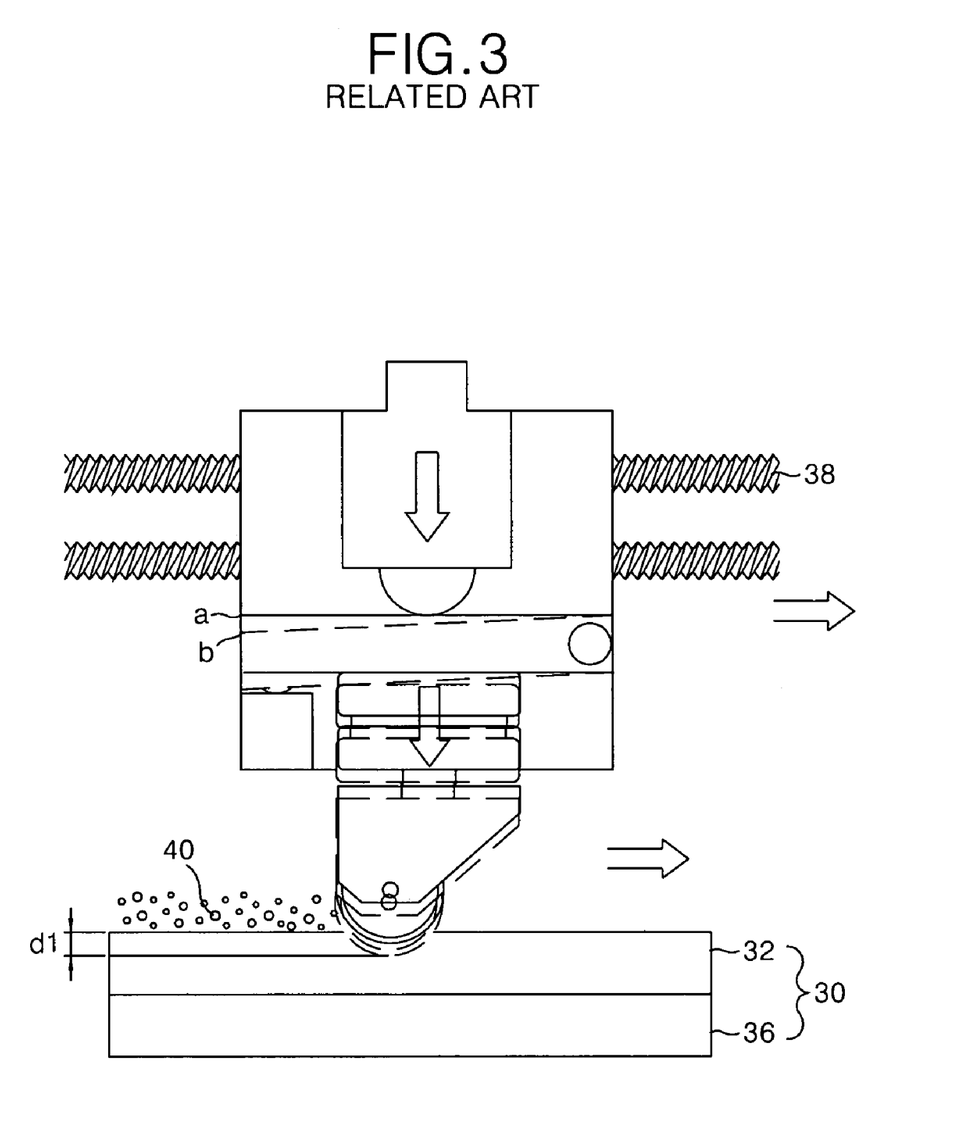
FIG. 3 is a diagram representing a scribing process of the scribing apparatus according to the related art.
Figure 4:
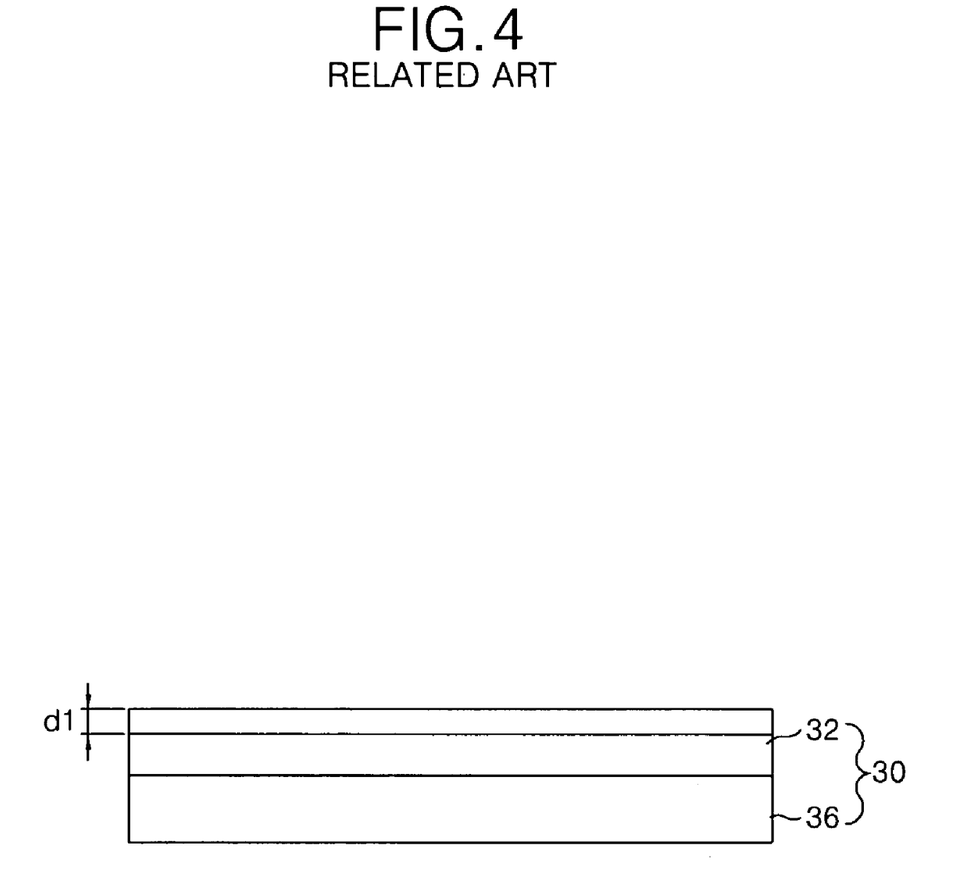
FIG. 4 is diagram representing a vertical crack formed in a substrate after the scribing process according to the related art.

To describe this more specifically, as shown in FIGS. 2 and 3, if compressed air is supplied to the air cylinder part 26 by a compressor (not shown), a pressurization body 27 descends toward the upper substrate 32 by the air pressure (2 to 3 $kgf/cm^2$) of the compressed air. The air pressure causing the pressurization body to descend is transmitted to a bar 25 and the bar 25 is tilted at a designated angle (from a to b) with a fixed shaft 28 as its central axis to move down toward an upper substrate 32. The descent of the bar 25 (from a to b) causes the air pressure to be transmitted to the wheel holder 10 and a pressurization projection 23. At this moment, the wheel holder 10 causes the wheel 2 to penetrate into the upper substrate 32 by the transmitted air pressure. Further, the pressurization projection 23 notifies a detection part 29 of the transmission of the air pressure, whereby the detection part 29 recognizes an electric signal to be in an on-state, thus it controls the location of the wheel head 20. At this moment, when the wheel head 20 is transferred along the drive shaft 38 of the transporting apparatus such as the ball screw, the pulley belt and the LM guide, the wheel 2 forms a vertical crack d1 of a designated depth in the upper substrate 32 in a direction that the wheel head 20 moves. As shown in FIG. 4, if the vertical crack d1 of the designated depth is formed in the upper substrate 32 as shown in FIG. 4, an impact is applied to a substrate 30 by use of a breaking bar (not shown) to form the vertical crack d1 in a large scale. And then, the vertical crack d1 is formed in a lower substrate 36 by the same method, and an impact is applied to the substrate 30 by use of the breaking bar (not shown) to form the vertical crack d1 in a large scale, thereby separating the substrate 30.

However, in the scribing apparatus of the related art in this way, as shown in FIG. 3, particles (glass chip powder) 40 are sputtered in an area where the vertical crack d1 is formed when the vertical crack d1 is formed in the substrate 30 by use of the wheel 2. The particles 40 result in deterioration of the substrate 30. Further, the scribing apparatus of the related art applies an impact to the substrate 30 by use of the breaking bar (not shown) after forming the vertical crack d1, this further deteriorates the substrate and decreases productivity due to the impact.

SUMMARY OF THE INVENTION

By way of introduction only, a scribing apparatus according to an aspect of the present invention comprises a scribing wheel adapted to scribe a substrate; a refrigerant supplier disposed near one side of the wheel adapted to supply a refrigerant to the substrate; and a hot steam supplier disposed near an opposing side of the wheel adapted to supply a hot steam to the substrate.

A scribing apparatus according to another aspect of the present invention comprises a wheel adapted to scribe a substrate; a first temperature shifter disposed to alter a temperature of a first portion of the substrate; and a second temperature shifter disposed to alter a temperature of a second portion of the substrate. The second temperature shifter alters the temperature of the substrate in the opposite direction as the first temperature shifter.

A scribing method according to still another aspect of the present invention comprises: causing a temperature difference on a substrate by cooling a first part of the substrate and heating a second part of the substrate at the same time; and scribing the substrate using scribing a wheel in contact with the substrate.

BRIEF DESCRIPTION OF THE DRAWINGS

The invention will be apparent from the following detailed description of the embodiments of the present invention with reference to the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Hereinafter, the preferred embodiment of the present invention will be described in detail with reference to FIGS. 5 to 7.

Figure 5:
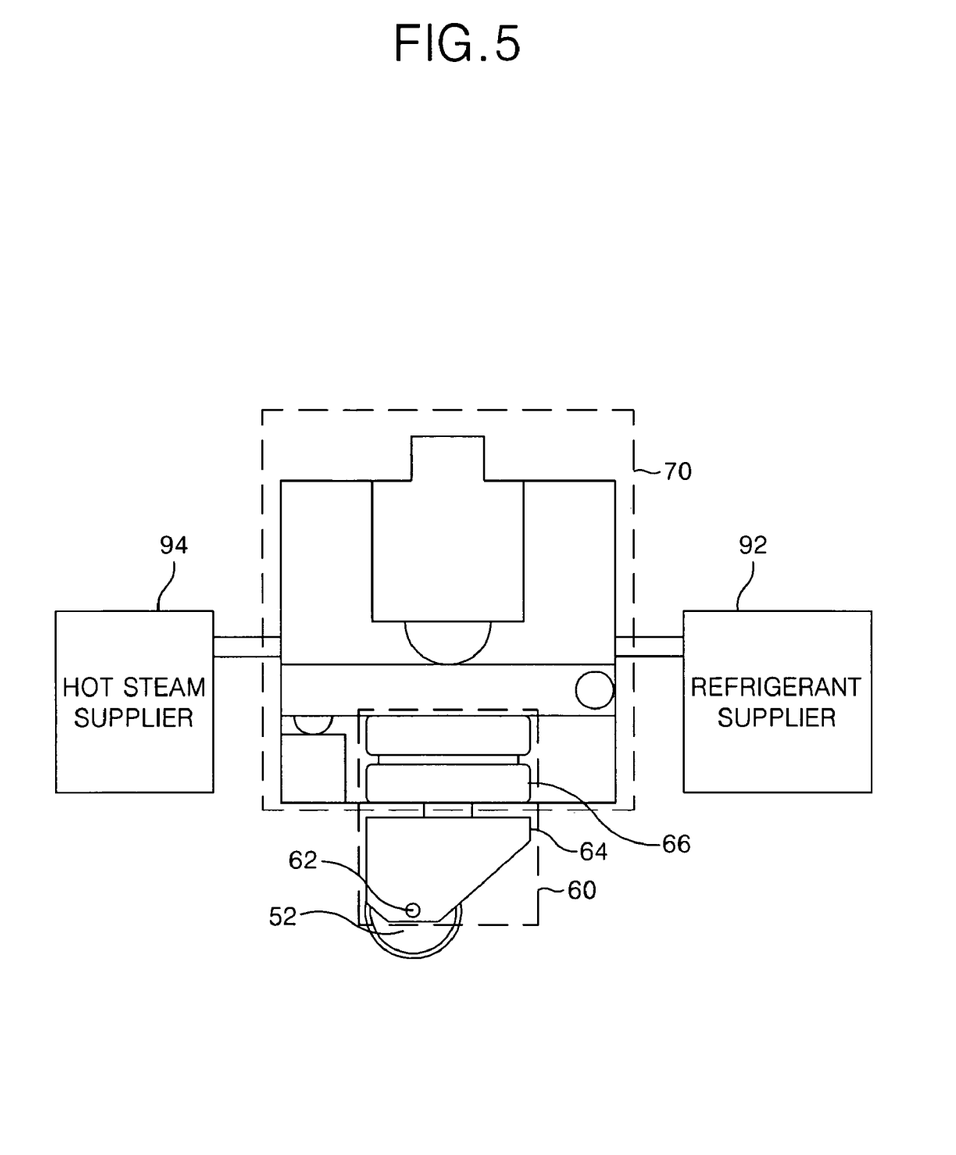
FIG. 5 is a diagram representing a scribing apparatus according to an embodiment of the present invention.

FIG. 5 is a diagram representing a scribing apparatus according to an embodiment of the present invention.

Referring to FIG. 5, the scribing apparatus according to the embodiment of the present invention includes a wheel 52 to form a vertical crack in a substrate 80, a wheel holder 60 to fix the wheel 52, a wheel head 70 to mount the wheel holder 60, a refrigerant supplier 92 to supply a refrigerant in front of a progress direction of the wheel 52, and a hot steam supplier 94 to supply compressed air at the rear of the progress direction of the wheel 52.

The wheel 52 is directly in contact with the substrate. The wheel 52 has a round disk shape of 2~3 mm in diameter of which the edge is ground in a designated angle, to form a vertical crack with a designated depth in the substrate.

A wheel holder 60 transmits the pressure applied from the wheel head 70 to the wheel 52 and acts to fix and to support the wheel 52. For this, the wheel holder 60 includes a fixing pin 62 to fix the wheel 52, a wheel fixing jig 64 to support the fixed wheel 52, and a bearing 66 to mount the wheel holder 60 in the wheel head 70.

The wheel head 70 has the wheel holder 60 descend and ascend in accordance with the air pressure of the compressed air supplied by a compressor (not shown). For this, the wheel head 70 includes a holder mounting part 22 on which the wheel holder 60 is mounted, a switching part 24 to control the contact between the wheel 52 and the substrate, and an air cylinder 26 to supply the air pressure of the compressed air supplied from the outside to the wheel holder 60. The wheel head 70 is transferred along a drive shaft of a transporting apparatus such as a ball screw, a pulley belt and an LM guide.

The refrigerant supplier 92 is installed in front of the direction in which the wheel 52 progresses to supply a refrigerant to a substrate 80 with a pressure of about 1 kgf/cm$^2$ to 1.5 kgf/cm$^2$ (desirably about 1.1 kgf/cm$^2$), wherein the refrigerant has a temperature of about 0° C.~5° C. (desirably about 2° C.). At this moment, the refrigerant supplied to the substrate 80 is a compound of nitrogen N2, water H2O and isopropyl alcohol IPA. The refrigerant supplier 92 is installed to be separated from the substrate 80 by about 5 mm to 10 mm (desirably about 8 mm). Further, the refrigerant supplier 92 is installed in front of the wheel by about 5 mm to 10 mm (desirably about 8 mm).

The hot steam supplier 94 is installed at the rear of the direction in which the wheel 52 progresses to supply a hot steam to a substrate 80, where the vertical crack is formed, with a pressure of about 1 kgf/cm$^2$ to 1.5 kgf/cm$^2$ (desirably about 1.1 kgf/cm$^2$), wherein the hot steam has a temperature of about 120° C.~150° C. (desirably about 125° C.).

The hot steam supplier 94 prevents particles (glass chip powder) 90 from being sputtered on the substrate 80 as well as removing the particles 90 formed on the substrate 80 by the wheel 52. Accordingly, deterioration of the substrate caused by the particles generated in the scribing apparatus of the related art can be prevented. The hot steam supplier 94 is installed to be separated from the substrate 80 by about 5 mm to 10 mm (desirably about 8 mm). Further, the hot steam supplier 94 is installed in the rear of the wheel 52 by about 5 mm to 10 mm (desirably about 8 mm).

Figure 6:
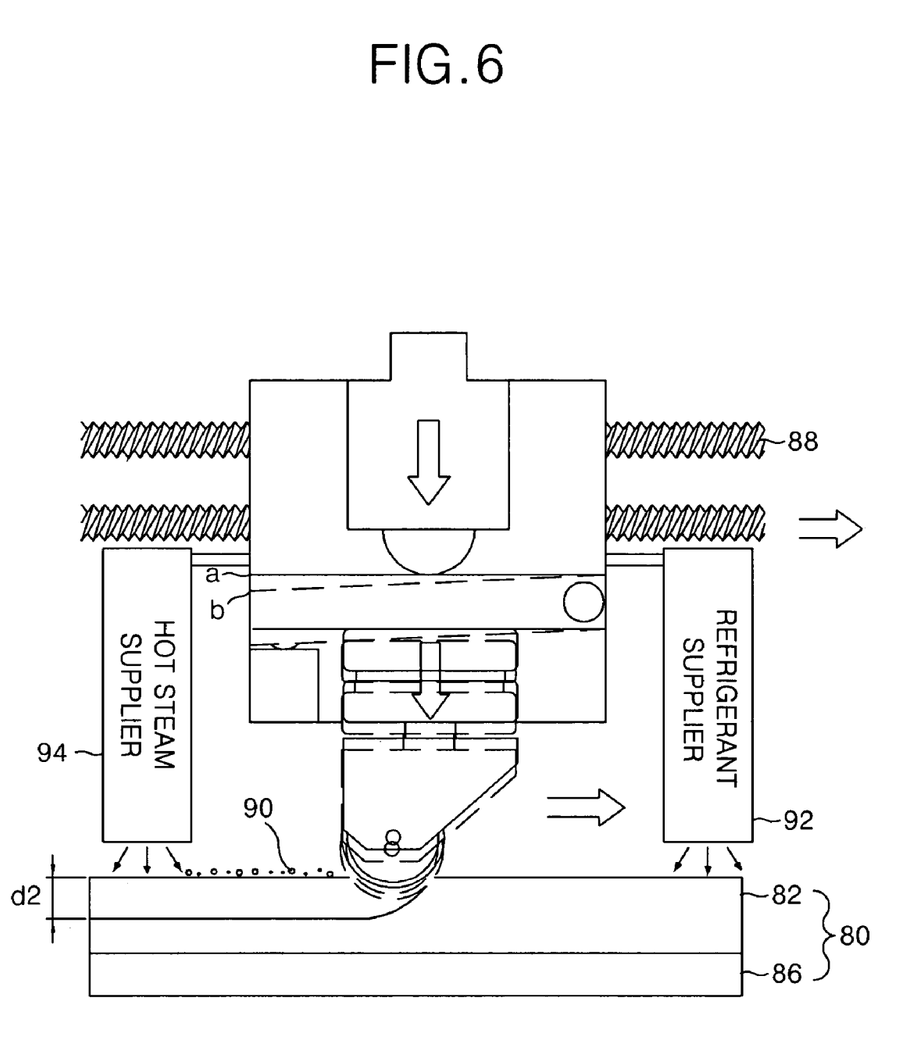
FIG. 6 is a diagram representing a scribing process by use of the scribing apparatus shown in FIG. 5.
Figure 7:
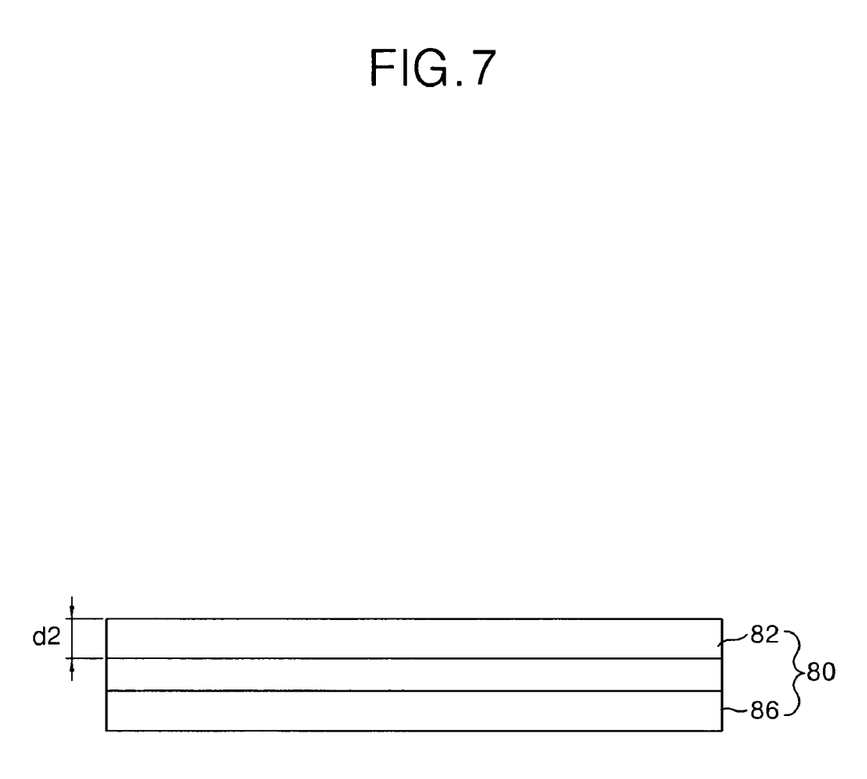
FIG. 7 is a diagram representing a vertical crack formed in a substrate after the scribing process by the scribing apparatus shown in FIG. 5.

The scribing apparatus, as shown in FIG. 6, supplies the refrigerant having a temperature of about 2° C. with a pressure of about 1.1 kgf/cm$^2$, from the refrigerant supplier 92 in front of the progress direction of the wheel 52 when the wheel 52 moves to form a vertical crack d2 in an upper substrate 82. And, it supplies the hot steam having a temperature of about 125° C. with a pressure of about 1.1 kgf/cm$^2$, from the hot steam supplier 94 in the rear of the progress direction of the wheel 52. Accordingly, a temperature difference is generated in front of and at the rear of the progress direction of the wheel 52, thus the vertical crack d2 is formed in the upper substrate 82 when the wheel head 70 is transferred along a drive shaft 88 in the same method as the scribing apparatus of the related art. This causes the vertical crack d2 to be bigger than the vertical crack d1 which is formed by the scribing apparatus of the related art. The particles 90 generated on the upper substrate 82 by the wheel 52 are removed by the hot steam supplied from the hot steam supplier 94. Further, the hot steam supplied from the hot steam supplier 94 prevents the particles 90 from being sputtered on the substrate 80. Accordingly, it is possible to prevent deterioration of the substrate caused by the particles generated in the scribing apparatus of the related art. When the vertical crack d2 is formed in the upper substrate 82, the substrate 80 is turned over to form the vertical crack d2 on a lower substrate 86 in the same manner, and then the substrate 80 is separated.

The scribing apparatus according to the embodiment of the present invention supplies the refrigerant and the hot steam in front of and at the rear of the direction that the wheel 52 progresses, thereby generating a temperature difference on the single substrate or bonded substrate 80. When the vertical crack is formed on the substrate 80 by use of the wheel 52, as shown in FIG. 7, the temperature difference of the substrate 80 causes a vertical crack to form that is bigger than the vertical crack d1 formed by the scribing apparatus of the related art. Accordingly, the separation of the substrate 80 can be performed with ease. Further, the particles 90 formed on the substrate 80 by the wheel 52 are removed by the hot steam supplied from the hot steam supplier 94, thus deterioration of the substrate 80 caused by the particle 90 can be prevented upon the scribing process. Additionally, extending the vertical crack by use of a breaking bar may or may not be necessary, thus possibly removing another cause of deterioration of the substrate and improving productivity.

As described above, the scribing apparatus and method of the substrate according to the present invention supplies the refrigerant and the hot steam in front of and at the rear of the progress direction of the wheel to generate a temperature difference on the substrate and to scribe the substrate, thus increasing the depth of the vertical crack. Additionally, the scribing apparatus and method of the substrate according to the present invention can easily separate the substrate. Further, the scribing apparatus and method of the substrate according to the present invention may eliminate the process of applying an impact to the substrate by use of the breaking bar, thus the substrate deterioration caused by an excessive impact may be prevented and productivity can be increased.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A scribing apparatus, comprising:
   a scribing wheel adapted to scribe a substrate;
   a refrigerant supplier disposed in front of the scribing wheel in a progress direction of the scribing wheel and adapted to supply refrigerant having a temperature between about 0° C. to 5° C. to the substrate; and
   a hot steam supplier disposed in back of the scribing wheel in the progress direction of the scribing wheel and adapted to supply hot steam having a temperature between about 120° C. to 150° C. to the substrate to clean the substrate and remove particles created by scribing the substrate using the scribing wheel,
   wherein the scribing wheel, the refrigerant supplier and the hot steam supplier together move along the progress direction of the scribing wheel,
   wherein the scribing wheel is positioned between the refrigerant supplier and the hot steam supplier, and
   wherein the scribing wheel, the refrigerant supplier and the hot steam supplier move together in the same direction.

2. The scribing apparatus according to claim 1, wherein the refrigerant supplier and the hot steam supplier are disposed such that when the substrate is provided to be scribed, the refrigerant supplier and the hot steam supplier are each separated from the substrate by about 5 mm to 10 mm.

3. The scribing apparatus according to claim 2, wherein the refrigerant supplier and the hot steam supplier are each separated from the scribing wheel by about 5 mm to 10 mm.

4. The scribing apparatus according to claim 3, wherein the refrigerant supplier and the hot steam supplier spray the refrigerant and the hot steam with a pressure of about 1 kgf/cm² to 1.5 kgf/cm².

5. The scribing apparatus according to claim 4, wherein the refrigerant includes at least one of nitrogen N2, water H2O or isopropyl alcohol IPA.

6. A scribing apparatus, comprising:
   a scribing wheel adapted to physically contact a surface of a substrate and scribe the substrate;
   a first temperature shifter disposed in front of the scribing wheel in a progress direction of the scribing wheel to lower a temperature of the substrate, wherein the first temperature shifter supplies refrigerant having a temperature between about 0° C. to 5° C. to the substrate; and
   a second temperature shifter disposed in back of the scribing wheel in the progress direction of the scribing wheel to raise a temperature of the substrate, the second temperature shifter configured to clean and remove particles created by scribing the substrate using the scribing wheel, said second temperature shifter using steam to clean the substrate and remove the particles, wherein the second temperature shifter supplies hot steam having a temperature between about 120° C. to 150° C. to the substrate,
   wherein the scribing wheel, the first temperature shifter and the second temperature shifter together move along a progress direction of the scribing wheel,
   wherein the scribing wheel is positioned between the first temperature shifter and the second temperature shifter, and
   wherein the scribing wheel and the first and second temperature shifters move together in the same direction on the substrate.

7. The scribing apparatus according to claim 6, wherein the first and second temperature shifters are disposed on opposite sides of the scribing wheel.

8. The scribing apparatus according to claim 7, wherein the first and second temperature shifters are substantially laterally equidistant from the scribing wheel.

9. The scribing apparatus according to claim 6, wherein the first and second temperature shifters are disposed such that the first and second temperature shifters are substantially vertically equidistant from the substrate.

10. The scribing apparatus according to claim 6, wherein the first and second temperature shifters supply materials with a relative temperature difference sufficient to propagate a vertical crack formed in a glass substrate by application of the scribing wheel.

11. The scribing apparatus according to claim 6, wherein the first and second temperature shifters spray materials at a sufficient pressure to substantially remove particles generated by application of the scribing wheel on the substrate from the substrate.

12. The scribing apparatus according to claim 6, wherein the first and second temperature shifters respectively supply a refrigerant and a hot stream.

* * * * *